Aug. 30, 1966 J. B. MANDLE 3,270,281
APPARATUS FOR MEASURING AND DIGITALLY INDICATING LINEAR DISPLACEMENT BETWEEN TWO RELATIVELY MOVABLE MEMBERS
Filed Dec. 3, 1962
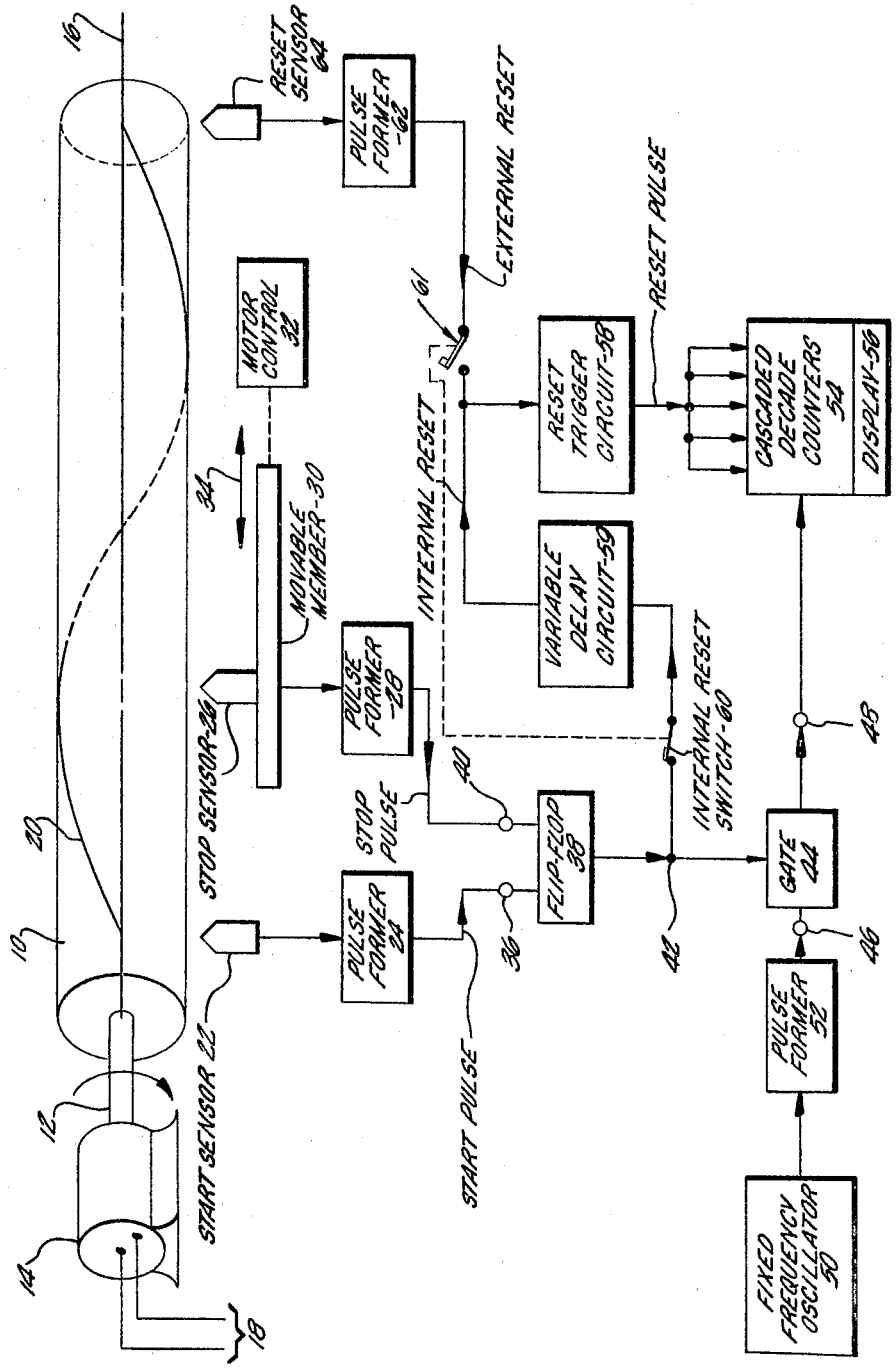
INVENTOR.
JOHN B. MANDLE
BY
Christie, Parker & Hale
ATTORNEYS.

United States Patent Office 3,270,281
Patented August 30, 1966

3,270,281
APPARATUS FOR MEASURING AND DIGITALLY INDICATING LINEAR DISPLACEMENT BETWEEN TWO RELATIVELY MOVABLE MEMBERS
John B. Mandle, 1766 Vistillas Road, Altadena, Calif.
Filed Dec. 3, 1962, Ser. No. 241,696
5 Claims. (Cl. 324—68)

The present invention is directed to improvements in transducers and, more particularly, to a novel transducer apparatus for detecting the displacement of a movable member from the reference position.

Transducers for detecting displacement of movable members are well known. Such transducers are generally arranged so that movement of the member being monitored causes the value of one or more electrical components, such as a resistor, a capacitor, or an inductor, to vary and produce a corresponding change in the value of an electrical signal developed by the transducer. The use of variable electrical components to develop the electrical signals of varying value causes the accuracy of conventional displacement transducers to be limited by the linearity of the variable electrical components, the stability of the power supplies from which the electrical signals are derived, and the accuracy of the means for measuring the electrical signals. In particular, variations in the electrical components either with age or surrounding conditions, as well as variations in their associated power supplies, produce undesired variations in the value of the electrical signals developed by the transducers and hence inaccuracies in the detection of the displacement of a movable member from a reference position. In addition to the accuracy limitations of conventional displacement transducers, such transducers are generally limited in the range or resolution of physical displacements which they can detect.

In view of the above, the present invention provides a novel transducer arrangement which is extremely accurate and which is capable of detecting large variations in the displacement of a movable member from a reference position.

Briefly, to accomplish this, the transducer of the present invention comprises means for translating displacement of a movable member into a time interval which accurately indicates the displacement of the movable member from a reference position.

The structural arrangement of the present invention for providing such a translation basically includes a cylindrical drum mounted for rotation about its longitudinal axis. The drum is continuously rotated at a uniform velocity by a motor drive coupled thereto. Included on the cylindrical surface of the drum are means forming a spiral which is detectable from the remaining surface of the drum. Positioned adjacent the cylindrical surface of the drum is a first detector means. The detector means is arranged to define a reference position for the movable member and produces a first electrical signal when a portion of the spiral passes the first detector. Mounted on the movable member for movement therewith is a second detector. The second detector is positioned adjacent the surface of the cylindrical drum and produces a second electrical signal when a portion of the spiral passes the second detector. Preferably, the second detector is aligned with the first detector along the surface of the drum to lie in a common plane with the first detector and the axis of rotation of the drum. Coupled to the first and second detectors is a timing means for receiving the first and second electrical signals. The timing means is arranged to count at a predetermined rate in response to the first electrical signal and to stop counting in response to the second signal. The count stored within the timing means then provides an indication of the time between the occurrence of the first and second electrical signals. Since the drum is rotating at a constant velocity the time interval between the first and second electrical signals is directly proportional to the displacement of the second detector from the first detector. Accordingly, the count stored in the timing means provides a direct indication of the displacement of the movable member from the reference position.

For a more complete understanding of the specific arrangement and features of the present invention, reference may be made to the following detailed description and the drawing, the single figure of which is a schematic-block diagram representation of a preferred form of the present invention.

As indicated briefly above, the transducer of the present invention provides an extremely accurate indication of variations in displacement of a movable member from a reference position by translating the displacement of the movable member into a time interval. To provide such an arrangement the transducer, as illustrated in the drawing, includes a cylindrical drum 10. The drum 10 is coupled by a shaft 12 to a motor 14 for rotation about its longitudinal axis 16. The motor 14 is arranged to impart a uniform angular velocity to the drum 10 about its axis of rotation 16 in response to current signals applied to the input leads 18.

Included on the cylindrical surface of the drum 10 is means for forming a spiral 20. The spiral 20 preferably takes the form of a helix extending about the cylindrical surface of the drum 10 between points spaced slightly from the opposite ends of the drum. The material or structure forming the spiral 20 may take a number of different forms. For example, the spiral 20 may take the form of a groove etched into the surface of the drum or may be a magnetic strip disposed in the form of a spiral around the drum. Also, the spiral 20 may take the form of a dark or a light line on a contrasting background or, if the drum is hollow, may take the form of a slot with a light within the drum shining therethrough. The examples suggested are not exhaustive of the possibilities but are merely mentioned to suggest but a few of the arrangements for forming the spiral all of which have the common characteristics of being detectable from the remaining surface of the drum 10.

To provide means for accurately indicating the displacement of a movable member from a reference position the preferred form of the transducer of the present invention includes a plurality of sensor or detector elements arranged along the surface of the drum for detecting the spiral 20. The sensors may be of any conventional arrangement capable of sensing a portion of the spiral 20 as it passes adjacent thereto. The sensing of the spiral may take the form of the generating of an electrical signal, change in the amplitude of an existing electrical signal, or the closing of a circuit to allow the passage of an electrical signal. For example, when the spiral is in the form of a magnetic strip the sensors may comprise magnetic pick-up heads while if the spiral is in the form of a light or dark colored strip on the contrasting background the sensors may comprise a lens and light sensitive element.

In the apparatus illustrated in the drawing it may be assumed for further discussion that the spiral 20 is formed of a magnetic strip and that the sensors comprise magnetic pick-up heads arranged to produce electrical signals when a portion of the spiral passes immediately adjacent thereto.

As represented in the drawing, a first sensor 22 is positioned adjacent the surface of the drum 10 near the left end thereof. Preferably, the sensor 22 is fixedly located at this position and defines a reference position for a movable member from which its displacement is to be determined. The sensor 22 is arranged to develop an electrical signal when a portion of the spiral 20 passes thereunder. The electrical signal developed by the sensor 22 is applied to a pulse former 24 to develop a "start" pulse.

Also positioned along the surface of the drum 10 is a second sensor 26. The sensor 26 is positioned adjacent the surface of the drum and is arranged to produce an electrical signal when a portion of the spiral 20 passes immediately adjacent thereto. The electrical signal developed by the sensor 26 is applied to a pulse former 28 which develops a "stop" pulse.

The sensor 26, as illustrated, is fixedly coupled to a movable member 30, the displacement of which from the reference position is to be determined. The movable member 30 is mechanically coupled to a motor control unit 32. The motor control unit 32, which may be of any conventional design, functions to selectively position and reposition the movable member 30 along the drum 10 as indicated by the arrow 34.

Preferably, the sensor 26 is aligned with the sensor 22 along the surface of the drum 10 to lie in a common plane with the sensor 22 and the axis of rotation 16 of the drum 10. In such an arrangement, with the drum 10 rotating at a constant angular velocity it can be shown that the time interval between the occurrence of the "start" and "stop" pulses is directly proportional to the displacement of the sensor 26 from the reference position defined by the sensor 22. In particular, the time interval between the electrical signals may be represented by the following expression:

$$t = \frac{S}{LW} \qquad (1)$$

where S is the distance between the two points to be detected, L is the axial length of the spiral 20 in inches and W is the rotational speed of the drum in revolutions per second.

Thus, by employing the basic arrangement of the drum 10 with the spiral 20 and a pair of sensors 22 and 26 means are provided for translating the unkown displacement of a movable member from a reference position into a time interval which provides an accurate measure of the unknown displacement.

Although it is preferred that the sensor 26 be aligned as described with the sensor 22, such an arrangement is not mandatory and an accurate indication of displacement of the movable member 30 from the reference position may be had without the sensor 26 lying in a common plane with the sensor 22. In such an arrangement, however, a time allowance should be made for the time required for a point on the surface of the drum to traverse an arc between the position of the sensor 22 and the sensor 26. The time required for the point to traverse such an arc would then be either added to or subtracted from the time interval between the occurrence of the "start" and "stop" pulses depending upon the direction of displacement of the sensor 26 from the sensor 22 relative to the direction of rotation of the drum 10. Thus, for example, if the sensor 26 were positioned atop the drum 10 and the drum 10 were rotated in a clockwise direction, the time required for a point on the drum to traverse the arc between the sensors 22 and 26 would be added to the time interval between the "start" and "stop" pulses to indicate the displacement of the movable member from the reference position.

To provide means for indicating and measuring the time interval between the occurrence of the "start" and "stop" pulses the preferred form of the present invention includes a timing means arrangement to count at a predetermined rate in response to the "start" pulse and to stop counting in response to the "stop" pulse. The count stored within the timing means then provides the indication of the time interval between the "start" and "stop" pulses and an accurate measure of the dsplacement of the movable member 30 from the reference position defined by the sensor 22. Apparatus for measuring time intervals between electrical signals are well known and many different forms may be employed in the present invention without departing from the spirit and scope thereof. By way of example, the timing arrangement may take a form similar to that described in the Electronic Control Handbook by Ralph R. Batcher and William Moulic, published in 1946 by Caldwell-Clements Inc. of New York, New York (pages 188–193).

The timing means illustrated in the drawing is similar to the arrangement described in the Electronic Control Handbook. Therefore, for a detailed understanding of the components comprising the illustrated block diagram, reference may be made to the Electronic Control Handbook, the contents thereof being incorporated herein by reference.

Basically, to provide an indication of the time interval between the "start" and "stop" pulses generated by the sensors 22 and 26, respectively, the "start" pulse is applied to an input terminal 36 of a flip-flop 38 while the "stop" pulse is applied to an input terminal 40 of the flip-flop 38. The flip-flop 38 may be any conventional trigger circuit having two stable states. In its first stable state an output signal is developed by the flip-flop at its output terminal 42 having a relatively high level while in its second stable state the output signal is in a relatively low level. In response to the "start" pulse the flip-flop switches to its first stable state while in response to the "stop" pulse the flip-flop 38 switches to its second stable state.

The output terminal 42 of the flip-flop 38 is coupled to a gate circuit 44. The gate circuit 44 is also of conventional design and is normally in a closed state. In response to the relatively high level signal developed by the flip-flop 38 in its first stable state, the gate 44 is arranged to open and to pass electrical signals applied to its input terminal 46 to its output terminal 48. In the illustrated form of the present invention, the input terminal 46 is coupled to receive a train of pulses. The train of pulses is generated by a fixed frequency oscillator 50 the output of which is applied to a pulse former 52. The pulse former 52 is coupled to the input terminal 46. Thus, in response to the high level signal generated by the flip-flop 38, the train of pulses passes through the gate circuit 44 to the output terminal 48 thereof. The output terminal 48 of the gate 44 is coupled to a plurality of decade counters 54. The decade counters may be of any conventional design and are cascaded by means commonly known in the art. Associated with the decade counter is a visual display 56 which may take the form of a plurality of neon tubes which are selectively lighted to provide an indication of the count stored within the counters 54. The cascaded decade counters and display, by way of example, may take the form described in the aforementioned Electronic Control Handbook.

Thus, when the gate 44 is closed the train of pulse signals is applied to the counters 54 to cause the counters to count at a predetermined rate until the gate 44 is again closed in response to a low level signal developed by the flip-flop 38 in response to the "stop" pulse 40. Thus, at the occurrence of the "start" pulse the decade counters begin to count and continue to count until stopped in response to the "stop" pulse. Since the counters count at a predetermined rate determined by the frequency of the fixed frequency oscillator 50 the count stored within the counters is an accurate measure of the time interval between the occurrence of the "start" and "stop" pulses. Thus, an operator, by merely viewing the display 56, may be apprised of the exact time interval between the "stop" and "start" pulses and the distance between the movable member 30 and the reference position.

The resolution of the displacement measured by the displacement transducer of the present invention is extremely high. The attainable resolution is determined by the frequency of the pulses generated by the fixed frequency oscillator 50 and may be represented by the following expression:

$$R = \frac{WL}{f} \quad (2)$$

where R is the resolution of the transducer in inches per count stored in the decade counter 54, $f$ is the frequency of the pulses generated by the fixed frequency oscillator 50 in cycles per second, W is the angular velocity of the cylinder in revolutions per second, and L is the axial length of the spiral 20 in inches. Thus, for example, when L is ten inches, W one revolution per second and $f$ one hundred kilocycles the attainable resolutions is 0.0001 inch per count. This resolution is an order of magnitude higher than that attainable with conventional displacement transducers over equivalent range of displacements.

In order to provide a cyclical and relatively continuous measurement of the displacement of the movable member 30 from the reference position it is desired to reset the counters 54 after each reading. To provide for such an operation the timing means of the present invention includes a reset trigger circuit 58 such as a conventional thyratron trigger circuit. The reset trigger circuit 58 has its output coupled to each of the cascaded decade counters 54 and in response to a pulse signal of a predetermined amplitude applied thereto produces an output signal which causes the decade counters to be reset to their initial zero count condition. Such a resetting of the counters may be accomplished by reducing the magnitude of the bias applied in common to all tubes in the counters to cause the tubes to assume a predetermined initial count condition.

The reset trigger circuit 58 has its input coupled through a variable delay circuit 59 in series with an internal reset switch 60 to the output terminal 42 of the flip-flop 38. The input to the trigger circuit 58 is also coupled through a switch 61 in series with a pulse former 62 to a reset sensor 64. The switch 61 is arranged to be open when switch 60 is closed and to be closed when switch 60 is open.

The reset sensor 64 is positioned along the surface of the drum 10 and similar to the sensors 22 and 26, is arranged to produce an electrical signal when a portion of the spiral 20 passes immediately adjacent thereto. The sensor 64 is disposed adjacent the end of the drum 10 over an end of the spiral 20 remote from the sensor 22. Thus, in the arrangement illustrated, as the drum 10 rotates the sensor 22 generates a "start" pulse, then the sensor 26 generates a "stop" pulse followed by an external reset pulse generated by the pulse former 62 in response to the electrical signal produced by the reset sensor 64. This sequence is repeated for each complete revolution of the drum 10.

The arrangement thus described provides for optional reset operation of the cascaded decade counters 54 under the control of an operator. If the internal reset switch 60 is closed and the switch 61 is open as illustrated, the output signals developed at the output terminal 42 of the flip-flop 38 are applied through the variable delay circuit 59 to the trigger circuit 58. The trigger circuit 58 is arranged to only be responsive to the low signal level developed by the flip-flop 38 when in its second stable state. Thus, when a "stop" pulse occurs to cause the flip-flop to switch to its second stable state, a low signal level is generated, delayed for a predetermined time by the delay circuit 59 and applied to the trigger circuit. The delayed low level signal energizes the trigger circuit 58 to develop an output signal of a predetermined magnitude. The output signal, in turn, then causes each of the decade counters to be reset to its initial state.

The delay circuit may be of any conventional design and is adjustable to provide a delay sufficient to allow an operator to view the count stored in the display 56 after the "stop" pulse and to accurately determine the time interval between the "start" and "stop" pulses and hence the displacement of the moveable member from the reference position.

In the above arrangement, the reset sensor 64 and pulse former 62 are not required elements in the over-all system and the external reset pulse has no resetting effect since at the time of its occurrence the counters are already reset.

If, however, it is desired to reset the counters upon each revolution of the cylinder 10, the internal reset switch 60 is opened and the switch 61 is closed. This removes the reset trigger circuit 58 from the control of the flip-flop 38 and places the trigger circuit solely under the control of the reset sensor 64. The reset trigger circuit 58 is arranged such that upon receipt of the external reset pulse generated by the pulse former 62, the reset trigger circuit 58 develops an output signal which, when applied to each of the decade counters, causes the decade counters to be reset to their initial count condition. Thus, for each revolution of the cylinder the counters are reset by an external reset pulse to provide a substantially continuous monitor upon the displacement of the movable member from the reference position. In such an arrangement it may be desired, due to the relatively short time interval between the "stop" and external reset pulses, to incorporate additional read-out equipment for storing and providing a permanent record of the stored count for each revolution of the cylinder.

I claim:
1. A displacement transducer for detecting displacement of a movable member relative to a reference position, comprising:
   a rotating member including means defining a single helical line extending around and along the axis of rotation of the rotating member;
   means for rotating the rotating member at a constant velocity about its axis of rotation;
   a first detector positioned to define a reference position for the movable member, the first detector being arranged to produce a first electrical signal when a portion of the helical line defining means passes the first detector;
   a second detector mounted on the movable member for movement therewith parallel to the axis of rotation of the rotating member, the second detector being arranged to produce a second electrical signal when a portion of the helical line defining means passes the second detector;
   digital counting means;
   means for pulsing the counting means a predetermined rate;
   and means receiving the first and second signals for initiating counting of the digital counting means in response to the first signal and stopping the counting of said digital counting means in response to the second signal to provide a digital indication of the time between the first and second signals.

2. A transducer for converting a variable linear distance into an electrically defined proportional time interval, comprising:
   a rotating member including means defining a helical line extending around and along the axis of rotation of the rotating member;
   means for driving the rotating member at constant angular velocity;
   means for generating a first electrical impulse when the rotating member is in a predetermined angular position;
   means for generating a second electrical impulse including a detector movable parallel to the axis of rotation of the rotating member and sensitive to said line defining means when a point on the line is moved into position opposite the detector by rotation of the member, the first and second impulses defining said time interval;
   interval timing means including starting and stopping means for indicating the elapsed time between the starting and stopping of the timing means;

means responsive to an impulse from the first impulse generating means for activating said starting means; and means responsive to the second impulse generating means for activating said stopping means.

3. Apparatus as defined in claim 1 further including means responsive to said second signal for resetting the digital counting means to its initial state.

4. Apparatus as defined in claim 3 wherein the resetting means includes a delay circuit for delaying the resetting of the counting means to a time after the occurrence of the second signal and prior to the re-occurrence of the first signal.

5. Apparatus as defined in claim 1 further including a third detector positioned adjacent the rotating member and being spaced relative to the first detector such that the helical line defining means passes the third detector prior to re-passing the first detector, the third detector producing a third electrical signal in response to a portion of the helical line defining means passing the third detector; and means receiving the third signal for resetting the digital counting means to its initial state.

References Cited by the Examiner

UNITED STATES PATENTS

| | | | |
|---|---|---|---|
| 2,371,963 | 3/1945 | La Pierre | 250—219 |
| 2,575,759 | 11/1951 | Higinbotham | 324—686 |
| 2,848,569 | 8/1958 | Moss | 200—27 |
| 3,100,847 | 8/1963 | Von Hacht | 250—237 |
| 3,160,463 | 12/1964 | Moscarini | 324—70 |

WALTER L. CARLSON, *Primary Examiner.*

M. J. LYNCH, *Assistant Examiner.*